A. D. HOFFMAN.
ODOMETER.

No. 45,157. Patented Nov. 22, 1864.

UNITED STATES PATENT OFFICE.

AUSTIN D. HOFFMAN, OF WAYNE, MICHIGAN.

IMPROVEMENT IN ODOMETERS.

Specification forming part of Letters Patent No. 45,157, dated November 22, 1864.

*To all whom it may concern:*

Be it known that I, AUSTIN D. HOFFMAN, of Wayne, in the county of Wayne and State of Michigan, have invented a certain new and useful Improvement in Odometers for Measuring Distances Traveled by Wheel-Vehicles; and I do hereby declare the following to be a full and exact description of the same, reference being had to the accompanying drawings, making part of this specification, in which—

Figure 1:
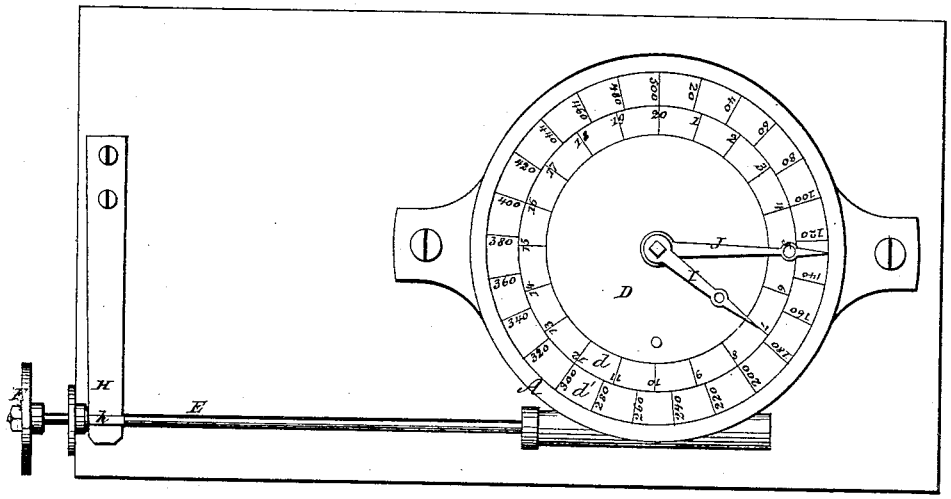
Figure 2:
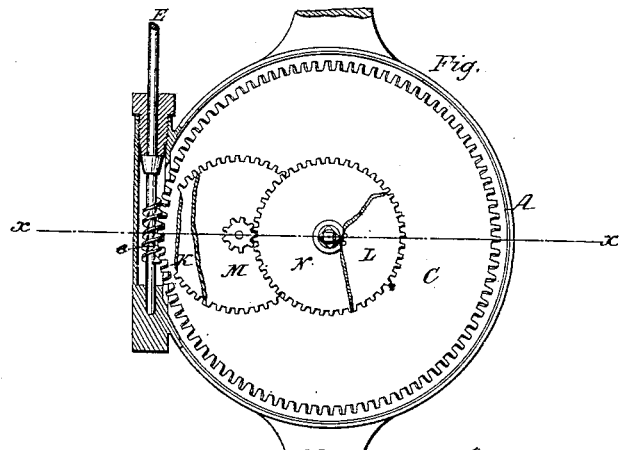
Figure 3:
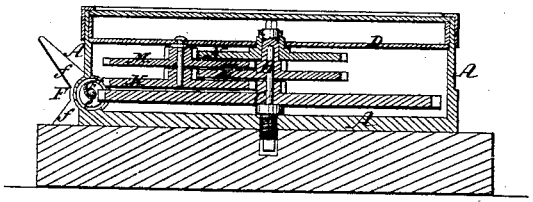

Figure 1 is a front view of the apparatus. Fig. 2 is a similar view with the dial removed and some parts shown in section to illustrate more clearly the working parts. Fig. 3 is a longitudinal section at $x\ x$, Fig. 2.

Similar letters of reference indicate like parts in the several views.

My invention relates to that class of odometers in which a pin or projection upon the wheel-hub is made to act upon a sprocket-wheel, and thereby rotate a hand, which indicates upon a dial the number of revolutions of the wheel, and consequently the distance traveled by the vehicle.

The present improvement consists, first, in combining with the connecting-shaft of an odometer a brake to regulate its motion and prevent it from turning at an improper time or to an undue extent by momentum or from accidental causes; second, in combining with the connecting-shaft of an odometer a suitable system of gearing, double dial, and hands, that one hand may act as a tally for the other, as hereinafter described.

A represents a casing having upon its face a dial, D, and designed to be attached near the center of the rear axle of a buggy or other vehicle. The said dial is constructed with two scales, $d\ d'$, adapted for use with separate hands, rotated at such relative speeds that one may constitute a "tally" for the other. In the present illustration the inner dial, $d$, is graduated to represent twenty miles, as indicated by an entire revolution of the short hand I. The outer dial, $d'$, is divided into twenty-five twenty-mile spaces, and the large hand J, which traverses the said outer scale, is connected with the shaft of the hand I through a train of gearing, K L M N, so proportioned and arranged that an entire revolution of the short hand I will be accompanied by a motion of the long hand J over one of the twenty-miles paces upon the dial $d'$. The shaft B of the hand I is rotated by a worm-wheel, C, which is driven by a screw-thread or spiral flange, $e$, upon the connecting-shaft E.

F represents a sprocket-wheel upon the end of said shaft, formed with a suitable number of teeth, $f$, which, being acted on in customary manner by a pin or projection upon the wheel-hub, turns the said shaft to the required extent at each revolution of the wheel of the vehicle to which the apparatus is applied.

H represents a spring, bearing against a square, $h$, formed upon the shaft E, for the purpose of preventing any rotation of the said shaft by momentum or from any accidental cause. The motion is thus rendered regular, one tooth at a time, as imparted by the wheel-hub to the sprocket-wheel F.

The operation of my invention will be clearly understood from the foregoing description.

Its advantages are great compactness and simplicity of construction in comparison with the scope of the apparatus, an instrument of moderate size being adapted to keep an accurate and unfailing record of all distances traveled, even up to five hundred miles.

I do not claim, broadly, the application of double dials to an odometer, as I am aware that under a different arrangement of the dials and other parts double dials have before been used; neither do I claim constructing an odometer with loose gearing arranged to turn independently upon a common shaft.

Having thus described my invention, the following is what I claim as new therein and desire to secure by Letters Patent:

1. The spring or brake H, employed in the described combination with the worm-shaft E of an odometer to regulate its rotation.

2. The double dial $d\ d'$ and gearing K L M N, arranged as specified, in the described combination with the worm-shaft E and sprocket-wheel F of an odometer.

The above specification of my improvement in odometers signed this 26th day of August, 1864.

AUSTIN D. HOFFMAN.

Witnesses:
CHARLES D. SMITH,
OCTAVIUS KNIGHT.